March 8, 1938.  F. PATRIA  2,110,169
SIGNAL DEVICE FOR AUTOMOBILES
Filed March 21, 1936
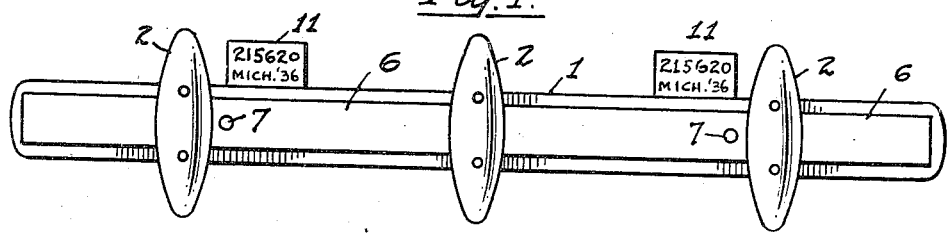
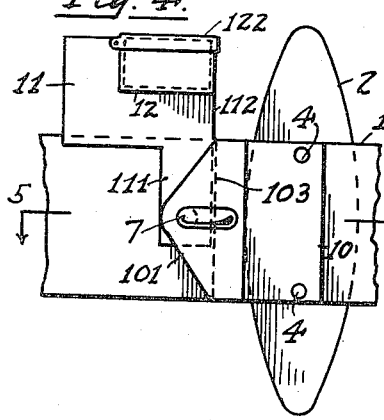
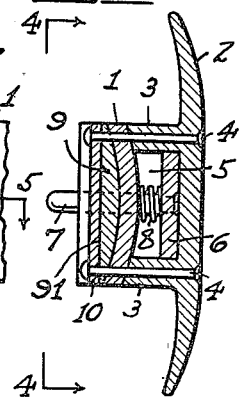
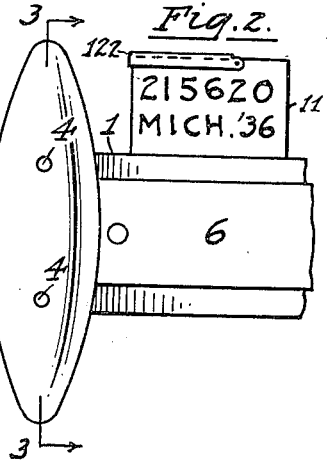
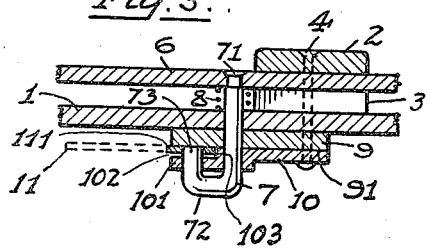
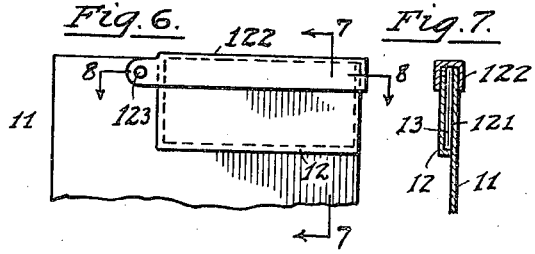
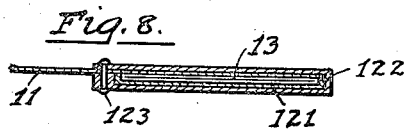
INVENTOR
Frank Patria Patented Mar. 8, 1938

2,110,169

UNITED STATES PATENT OFFICE 2,110,169

SIGNAL DEVICE FOR AUTOMOBILES

Frank Patria, Detroit, Mich.

Application March 21, 1936, Serial No. 70,022

6 Claims. (Cl. 116—32)

My invention relates to signal devices for automobiles, and its object is to protect the public against what are known as "hit-run" drivers, that is to say, drivers who, after colliding with another vehicle or with a pedestrian, escape from the scene of the accident without revealing their identity.

An essential feature of my said invention lies in the provision of a detachable member or members, mounted upon the bumper or other part of the vehicle, which carry some identifying indicia, such as for example, the license number of the vehicle, and will become detached from the vehicle and be left upon the ground whenever the said vehicle strikes a pedestrian or other object, so that witnesses of the accident may pick up the member and give it to the proper authorities.

In order that my invention may be thoroughly understood I will now describe a preferred form of the same with reference to the accompanying drawing in which—

Figure 1 is a front elevation of an automobile bumper having my invention applied thereto.

Figure 2 is a fragmentary front elevation, drawn to an enlarged scale, showing the position of the identifying member in its relation to the bumper.

Figure 3 is a transverse section taken on line 3—3 of Figure 2.

Figure 4 is a fragmentary rear elevation taken on line 4—4 of Figure 3.

Figure 5 is a sectional plan view taken on line 5—5 of Figure 4.

Figure 6 is a fragmentary rear elevation of the identifying member illustrating a detail.

Figure 7 is a section on line 7—7 of Figure 6, and

Figure 8 is a sectional plan view taken on line 8—8 of Figure 6.

Like characters designate corresponding parts throughout the several views.

1 is the regular vehicle bumper provided with a plurality of guards 2, in the present case three in number. The guards 2, as shown more clearly in Figure 3, are spaced apart in a forward direction from the bumper 1 by means of the integral separators 3 and are connected to the bumper by means of rivets 4, there being a central space 5 left between the guard and the bumper. Within the spaces 5 of the guards and extending substantially throughout the length of the main bumper is a flat bar 6 which is maintained in slidable relation with the bumper by bolts 7, and between the bar 6 and the bumper and surrounding the bolts 7 are the helical springs 8 which yieldably hold the bar 6 against the inner faces of the guards 2, as shown in Figures 3 and 5.

When the rear face of the bumper 1 is of hollow arcuate construction as herein illustrated, I provide fillers 9 which fit closely against the bumper and have flat rear surfaces 91, and upon these surfaces I mount a guide member 10 having an offset portion 101 so arranged as to provide between it and the surface 91 of the member 9 a vertical channel 102 adapted to receive the dependent portion 111 of a plate 11 shown in rear elevation, in Figure 4.

The fillers 9 and the guide members 10 are secured to the bumper 1 by the rivets 4 which also secure the guards 2 thereto, and the bolt 7, being secured to the bar 6 at 71 by riveting or other means, passes through the bumper 1, the filler 9, and the guide member 10 and terminates in a hook 72 having a forwardly extending part 73 which passes through an opening in the offset part 101 of the member 10 and through a corresponding opening in the downward extension 111 of the plate 11. Thus, when the parts occupy the relative positions shown in Figures 3, 4, and 5, the plate 11 is held by the bolt 7 within the channel 102 and is maintained in a vertical position due to the fact that the edge 112 of the said plate is in sliding contact with the vertical face 103 of the member 10. Thus the plates 11, which carry upon their front surfaces indicia such as the license number shown in the drawing, are normally held in such position that they project above the upper edge of the bumper 1, as shown in Figure 1. When, however, the vehicle comes into contact with some object, the bar 6 is pushed in a rearward direction, against the action of the springs 8, which causes the portions 73 of the bolts 7 to be withdrawn from the openings in the plates, allowing the latter to fall to the ground and to be picked up by by-standers as above stated.

It will be observed from the drawing that the bar 6 will not be moved rearwardly when an object is struck by one of the guards 2. It is contemplated, however, that when a pedestrian is struck by a head-on movement of the vehicle the bar 6 is almost certain to receive a part of the impact, and the same consideration applies to cases where a vehicle or other object is struck by the end portions of the bar 6. It is believed that when two of the plates 11 are employed, as shown in Figure 1, one or other of them will be released after practically any type of collision except when the guards 2 are struck by some long parallel object such as the bumper of a colliding vehicle. It is preferred, however, to employ three guards instead of two as usual so that annoyance from unnecessary release of the plates 11 will be to a large extent avoided.

It will be understood from the foregoing description and by reference to the drawing that I have provided a device which is eminently suited for the purpose set forth, and while I have herein described and shown a preferred embodiment of my said invention, it will be understood by those skilled in the art that the same may be modified in various ways to suit varying requirements without departing from the spirit of my invention as defined in the appended claims. For example, in some cases I may provide upon the plates 11, in addition to the license number of the vehicle, a pocket in which may be carried a card having upon it the name and address of the driver or of the owner. Such an arrangement is shown in Figures 6, 7, and 8 from which it will be seen that there is provided upon the rear of the plate 11 a pocket 12, preferably of metal, having a space 121 adapted to receive a card or tablet 13 and having a cover 122 hinged at 123 to the main plate. By this provision a police or other official is enabled to check up the vehicles and see that the plates are in their proper positions as shown in Figure 1, and if not he may withdraw the card or tablet from the pocket 12 and take the proper steps to correct the matter. It is thought probable that the use of my device may eventually be made compulsory by law, and in such case the regular license plates at present in use may be substituted for the special plates herein described and shown.

Having thus described my said invention, what I claim and desire to secure by Letters Patent of the United States is:

1. In a device of the character described, the combination, with a vehicle bumper, of a plurality of forwardly extending guard members spaced longitudinally of said bumper and rigidly secured thereto, a bar arranged in parallel spaced relation with said bumper and extending therealong substantially throughout its length rearwardly of said guard members and forwardly of said bumper, a plurality of identifying members bearing indicia and positioned adjacent said guard members, and means arranged in co-operative relation with said bar and said bumper and identifying members whereby said identifying members will normally be resiliently held in exposed position and will be released by relative movement between said bar and said bumper.

2. In a device of the character described, the combination, with an automobile bumper, of a pair of guard members positioned in front thereof and arranged in spaced relation therealong, a bar arranged in parallel spaced relation with said bumper rearwardly of said guard members and yieldably held in contact with said members, a pair of identifying members carrying indicia and positioned adjacent said guard members, and means arranged in co-operative relation with said bar and said bumper and identifying members whereby said identifying members will normally be held in exposed position and will be released upon impact of said bar with an external object.

3. In a device of the character described, the combination, with an automobile bumper, of a pair of guard members positioned in front thereof and arranged in spaced relation therealong, a bar arranged in the spaces between the bumper and the guard members and in parallel spaced relation with said bumper rearwardly of said guard members and yieldably held in contact with said members, a plurality of identifying members carrying indicia and positioned adjacent said guard members, and means arranged in co-operative relation with said bar and said bumper and identifying members whereby said identifying members will normally be held in exposed position and at least one of them will be released upon impact of said bar with an external object.

4. In a device of the character described, the combination, with an automobile bumper, of a bar arranged in parallel spaced relation with said bumper and extending therealong substantially throughout its length, a plurality of members carrying identifying indicia and spaced apart, means arranged in co-operative relation with said bar and said bumper and identifying members whereby said members will normally be resiliently held in exposed position, and whereby at least one of said members will be released upon impact of said bar with an external object, and a plurality of guard members so positioned forwardly of said bar and spaced longitudinally therealong that said releasing means will be rendered inoperative when said object impacts said guard members only.

5. In a device of the character described, the combination, with a vehicle bumper, of a plurality of forwardly extending guard members spaced longitudinally of said bumper and rigidly secured thereto, a bar arranged in parallel spaced relation with said bumper and extending therealong substantially throughout its length rearwardly of said guard members and forwardly of said bumper, a plurality of identifying members bearing indicia and positioned adjacent said guard members, and means arranged in co-operative relation with said bar and said bumper and identifying members whereby said identifying members will normally be resiliently held in exposed position and will be released by relative movement between said bar and said bumper, said last-named means comprising bolts secured to said bar extending through to the rear of said bumper and terminating in hooks adapted to engage openings in said identifying members, resilient means adapted to yieldingly press said bar and said bumper apart and maintain said hooks in engagement with said openings, and a member engaging each of said hooks and positioned rearwardly of said identifying members whereby said members are moved out of engagement with said hooks when said bar is moved rearwardly against the action of said resilient means.

6. In a device of the character described, the combination, with a vehicle bumper, of a plurality of forwardly extending guard members spaced longitudinally of said bumper and rigidly secured thereto, aligned slots in said guard members, a bar arranged in parallel spaced relation with said bumper and slidably received within said slots, a plurality of identifying members bearing indicia and positioned adjacent said guard members, and means arranged in co-operative relation with said bar and said bumper and identifying members whereby said identifying members will normally be held in exposed position and will be released by relative movement between said bar and said bumper.

FRANK PATRIA.